(12) United States Patent
Potterf et al.

(10) Patent No.: US 9,620,894 B2
(45) Date of Patent: Apr. 11, 2017

(54) TECHNOLOGIES FOR HIGH-SPEED COMMUNICATIONS

(71) Applicant: Cisco Technology, Inc., San Jose, CA (US)

(72) Inventors: Jason Potterf, Austin, TX (US); George Edward Curtis, San Jose, CA (US); William Frank Edwards, Livermore, CA (US); Gregory Scott Lovelace, Cedar Park, TX (US); Keith Frank Tharp, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/933,411

(22) Filed: Nov. 5, 2015

(65) Prior Publication Data

US 2016/0056572 A1 Feb. 25, 2016

Related U.S. Application Data

(63) Continuation of application No. 14/142,617, filed on Dec. 27, 2013, now Pat. No. 9,209,556.

(51) Int. Cl.
*H01R 13/58* (2006.01)
*H01R 13/621* (2006.01)
(Continued)

(52) U.S. Cl.
CPC ..... *H01R 13/6215* (2013.01); *H01R 12/7076* (2013.01); *H01R 13/504* (2013.01); *H01R 13/5845* (2013.01); *H01R 13/5808* (2013.01); *H01R 24/60* (2013.01); *H01R 2201/04* (2013.01); *H04Q 1/142* (2013.01); *Y10T 29/49176* (2015.01)

(58) Field of Classification Search
CPC ............ H01R 12/7076; H01R 13/6215; H01R 13/504; H01R 13/5845; H01R 13/5808; H01R 24/60; H01R 2201/04; Y10T 29/49176; H04Q 1/142
USPC ......... 439/936, 76.1, 637, 79, 374, 362, 731
See application file for complete search history.

(56) References Cited

U.S. PATENT DOCUMENTS 3,090,936 A * 5/1963 Maitby ................ H01R 9/2416
439/595
5,108,313 A * 4/1992 Adams ................ H01R 13/514
439/607.47
(Continued)

*Primary Examiner* — Abdullah Riyami
*Assistant Examiner* — Nelson R Burgos-Guntin
(74) *Attorney, Agent, or Firm* — Polsinelli LLP

(57) ABSTRACT

Method, apparatus, and electrical cable for high-speed connections. The apparatus can include an electrical cable, a wire sorter, an electrical mating paddle, and a cable assembly. The wire sorter can be coupled to an end of the electrical cable, and configured to receive wires extending from the end of the electrical cable and position the wires relative to one another in a predetermined arrangement to yield sorted wires. The electrical mating paddle card can then be coupled to the sorted wires according to the predetermined arrangement. The cable assembly can be configured to house the wire sorter and at least a portion of the wires. Moreover, the cable assembly can include a hot-melt injection chamber configured to at least partially immobilize the wires relative to the cable assembly when hot-melt is injected into the hot-melt injection chamber.

20 Claims, 13 Drawing Sheets

(51) Int. Cl.
*H01R 12/70* (2011.01)
*H01R 13/504* (2006.01)
H01R 24/60 (2011.01)
H04Q 1/14 (2006.01)

(56) References Cited

U.S. PATENT DOCUMENTS

| | | | | |
|---|---|---|---|---|
| 5,609,499 | A * | 3/1997 | Tan | H01R 4/70 439/353 |
| 6,887,108 | B2 * | 5/2005 | Wu | H01R 13/516 439/638 |
| 7,503,802 | B2 * | 3/2009 | Tu | H01R 25/003 439/540.1 |
| 8,267,716 | B2 * | 9/2012 | Wu | H01R 9/032 439/455 |
| 2006/0246784 | A1 * | 11/2006 | Aekins | H01R 4/2433 439/676 |
| 2010/0221955 | A1 * | 9/2010 | Pepe | H01R 13/514 439/676 |
| 2011/0104910 | A1 * | 5/2011 | Kadomatsu | H01R 24/50 439/63 |
| 2013/0102203 | A1 * | 4/2013 | O'Malley | H01R 13/6469 439/701 |
| 2015/0187461 | A1 * | 7/2015 | Potterf | H01R 12/7076 174/76 |
| 2015/0280358 | A1 * | 10/2015 | Wiedemann | H01R 13/5804 439/460 |

* cited by examiner

TECHNOLOGIES FOR HIGH-SPEED COMMUNICATIONS

RELATED APPLICATIONS

This application is a continuation of U.S. patent application Ser. No. 14/142,617, filed Dec. 27, 2013, the contents of which are incorporated by reference herein.

TECHNICAL FIELD

The present technology pertains to high-speed communications, and more specifically pertains to mechanical attachments and electrical cables for connecting to high-speed communication devices.

BACKGROUND

The soaring demand for network data throughout the globe has steadily fueled the evolution and ubiquity of high-speed communications devices, such as routers, switches, modems, and high-speed mobile devices. A vast variety of high-speed communications devices have been engineered and manufactured to meet the numerous infrastructure, end-user, and data demands that currently abound. As a result, there is a wide variety of high-speed communications devices implemented in every network setting and route within a data communication path. Not surprisingly, interoperability, scalability, and upgradeability of devices in a network often pose a significant challenge, as there is currently no one-size-fits-all type of solution.

Much of the provisioning and consumption of data in a network is supported by various data transfer media, such as cables, cable adaptors, and connection interfaces. Such data transfer media are widely diverse and commonly subject to change due to upgrade and infrastructure requirements, as well as device specifications and even user preferences. Despite the diversity of these components, current solutions are rigid, often limiting support and compatibility to one specific type of component or form factor, and lack flexible mechanical support solutions for upgradeability of cables, connections, and other data transfer components. For example, currently, alternative attachments or connections require different adaptors to support the specific types of connections implemented, as current adaptors fail to offer adequate cross-component support and interoperability.

Yet data transfer media, such as cables, drive and enable the current wide-spread thirst for network data by interconnecting high-speed communications devices and carrying the data signals needed for high-speed communications. Unfortunately, these data transfer media are also frequently exposed to internal and external forces or pressures which often result in signal loss or degradation, by damaging cables and the mechanical relationship of the cables with other connection components. In fact, the vast majority of mechanical failures of such data transfer media are associated with broken or damaged components, such as wires, resulting from the various internal and external forces or pressures. Current solutions, such as cable boots for strain relief, provide some support and protection to data transfer media, but are largely inadequate and insufficient. These are problems that have plagued the industry throughout the history of data networks and high-speed communication devices.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
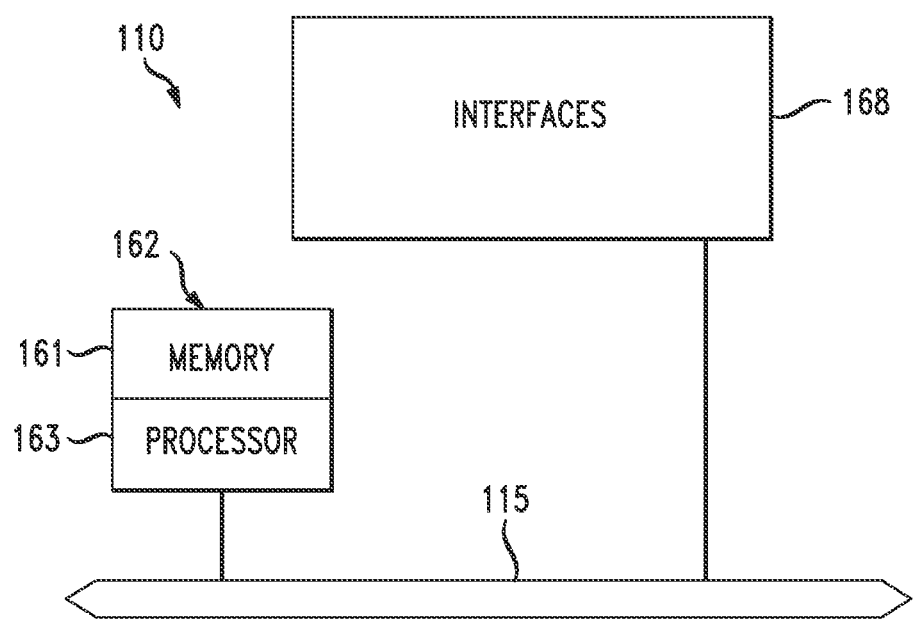
FIG. 1 illustrates an exemplary network device.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The approaches set forth herein can be implemented to provide a cable assembly mechanism to support high-speed communications. The cable assembly mechanism can reliably protect and immobilize the wires within the cable assembly, to significantly prevent mechanical failures resulting from forces or pressures exerted on cables. The cable assembly can provide a housing to the wires in the cable, and a hot-melt mold inside the housing to protect and secure the wires inside the cable assembly, and provide custom strain relief to the particular cable. The approaches herein can also be used to provide interchangeable mechanical pass-through support for high-speed communications devices. The pass-through support can limit the number of connection points to one across all configurations to better maintain signal integrity. Moreover, the approaches herein can provide field upgradeable stacking in a way that protects signal integrity, improves customer experience through ease of upgradeability, and flexibly supports multiple media types, including future media types.

Disclosed are methods, apparatuses, and electrical cables for high-speed connections. The apparatus can include an electrical cable, a wire sorter, an electrical mating paddle, and a cable assembly. The wire sorter can be coupled to an end of the electrical cable, and configured to receive wires extending from the end of the electrical cable and position the wires relative to one another in a predetermined arrangement to yield sorted wires. The electrical mating paddle card can then be coupled to the sorted wires according to the predetermined arrangement. The cable assembly can be configured to house the wire sorter and at least a portion of the wires. Moreover, the cable assembly can include a hot-melt injection chamber configured to at least partially immobilize the wires relative to the cable assembly when hot-melt is injected into the hot-melt injection chamber.

The apparatus can further include a crimp ring, such as a hexagonal crimp ring, configured to secure around the electrical cable. The crimp ring can limit the rotation and/or movement of crimped cables inside the cable assembly. Moreover, the crimp ring can be attached to an inside portion of the cable assembly that is adjacent to the hot-melt injection chamber to form a first wall of the hot-melt injection chamber. This first wall can help capture or secure the hot-melt inside the hot-melt injection chamber. The wire sorter can also form a second wall of the hot-melt injection chamber. This second wall can similarly help capture of secure the hot-melt inside the hot-melt injection chamber.

The hot-melt injection chamber can be a cavity inside the cable assembly for receiving and containing an injection of hot-melt. Moreover, the hot-melt injection chamber can receive hot-melt via one or more access holes in the cable assembly. Further, the wires from the cable can pass through the hot-melt injection chamber and the wire sorter. When injected with hot-melt, the hot-melt injection chamber can form a mold of hot-melt, which can capture the wires from the cable that pass through the hot-melt injection chamber in order to secure, immobilize, protect, shield, fix, restrict, strengthen, and/or align the wires from the cable. For example, the hot-melt injected into the hot-melt injection chamber can form a mold that at least partially immobilizes the wires from the cable that are contained in the hot-melt injection chamber. The wires—and any other component inside the hot-melt injection chamber—can be immobilized by the hot-melt such that movement of the wires relative to the cable assembly is at least partially restricted.

The mold of hot-melt can form a cable diecast. Moreover, the cable diecast can be contained within four walls in the hot-melt injection chamber. The four walls can include the first wall created by the crimp ring, the second wall created by the wire sorter, and a top and bottom wall formed by the cable assembly. This way, the cable assembly can fix or secure the hot-melt, the wire sorter, and the crimp ring into place. In addition, the cable assembly can provide support and/or strain relief to the cable and any wires or components contained within the cable assembly.

DETAILED DESCRIPTION

Figure 2:
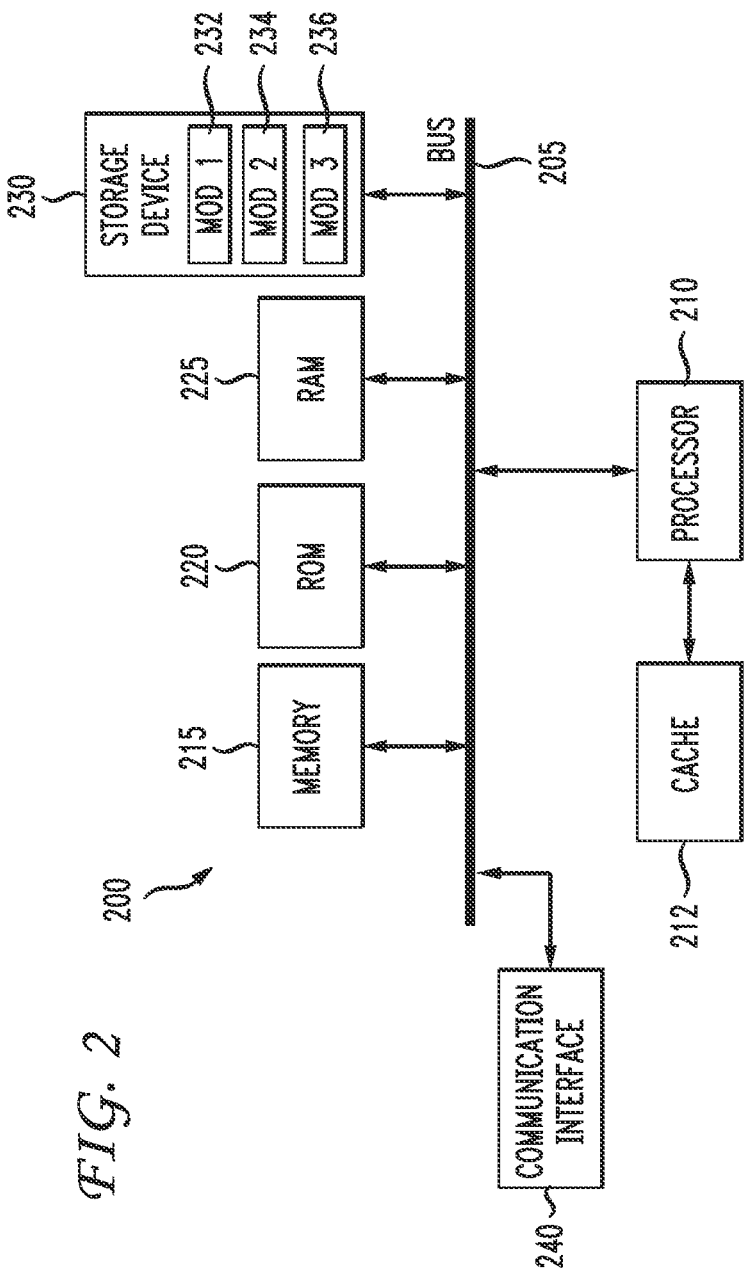
FIG. 2 illustrates an exemplary system embodiment.

The disclosed technology addresses the need in the art for providing effective strain relief, flexibility, and support for high-speed connections. Disclosed are methods, apparatuses, and electrical cables for high-speed connections. A brief introductory description of exemplary systems, as illustrated in FIGS. 1 and 2, is disclosed herein. A detailed description of high-speed connection devices and components, and exemplary variations, will then follow. These variations shall be described herein as the various embodiments are set forth. The disclosure now turns to FIG. 1.

FIG. 1 illustrates an exemplary network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such as miscabling detection functions, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 2 illustrates exemplary possible system embodiments, such a system making up network device 110. The more appropriate embodiment will be apparent to those of ordinary skill in the art when practicing the present technology. Persons of ordinary skill in the art will also readily appreciate that other system embodiments are possible.

FIG. 2 illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

Figure 3:
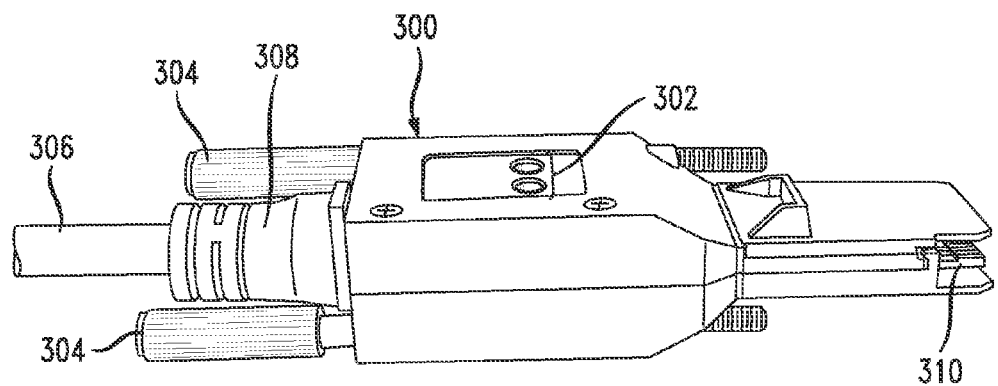
FIG. 3 illustrates an exemplary cable assembly mechanism.
Figure 4:
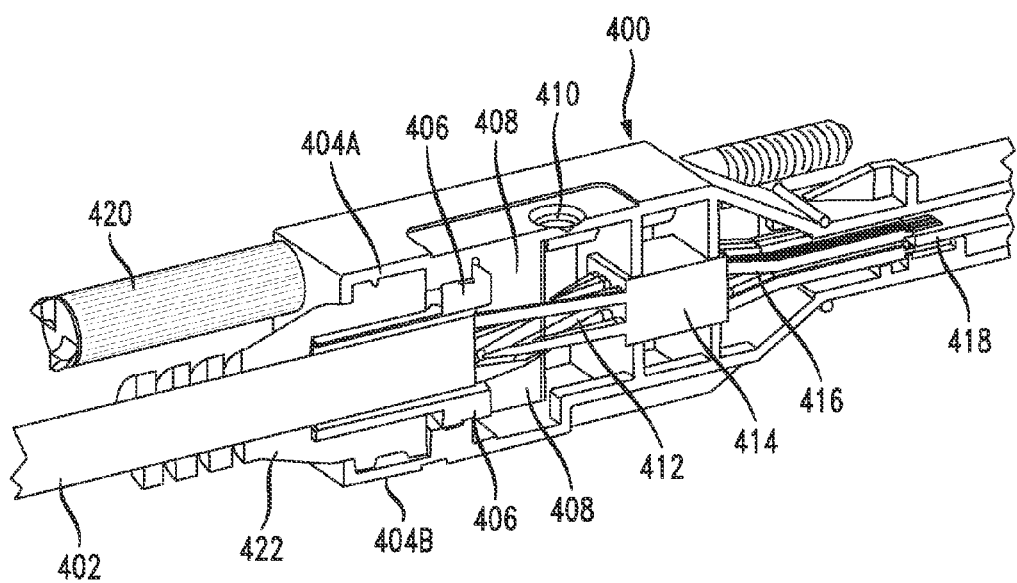
FIG. 4 illustrates an open, side view of an exemplary cable assembly mechanism.

FIG. 3 illustrates an exemplary cable assembly mechanism. Here, the cable 306 is mechanically attached to backshell 300. The backshell 300 can be a diecast enclosure, which can house a portion of the cable 306, a portion of wires extending from the cable 306, the electrical paddle card 310, and/or any other component associated with the cable 306, such as a crimp ring and/or a wire sorter, as illustrated in FIG. 4. The cable 306 can include a cable boot 308, which can interface with the backshell 300 and provide support or strain relief for the cable 306.

The backshell 300 can include screws 304 for attaching the backshell 300 to a device, such as a switch, via a chassis, a module, or an interface, for example. Moreover, the backshell 300 can include a hot-melt injection chamber (not shown), as illustrated below in FIG. 4. The hot-melt injection chamber can be configured to receive hot-melt via access holes 302 (or injection ports) on the backshell 300. In some cases, the hot-melt can be injected into the hot-melt injection chamber post assembly of the backshell 300, to form a custom diecast mold of the hot-melt injection chamber and any components housed inside the hot-melt injection chamber, such as the cable wires housed in the backshell 300. For example, after the backshell 300 is assembled, the hot-melt can be injected into the hot-melt injection chamber via access holes 302 to generate a mold or cable diecast inside the backshell 300. The mold or cable diecast here can be custom to the cable 306 and backshell 300. Moreover, the mold or cable diecast can provide strain relief to the cable 306, and secure or immobilize any components inside the backshell 300.

As one of ordinary skill in the art will readily recognize, the size or shape of the backshell 300, the number of access holes on the backshell 300, and the number of screws on the backshell 300 can vary. In FIG. 3, the size and shape of the backshell 300, the number of access holes 302, and the number of screws 304 are provided for illustration purposes, and can vary in other configurations or embodiments. Moreover, examples and variations of the internal components and configurations of the backshell 300 are further described below.

FIG. 4 illustrates an open, side view of an exemplary cable assembly mechanism 400. The cable assembly mechanism 400 can include a cable assembly 404A-B which houses or encloses a portion of the cable 402, wires 412 extending from the cable 402, wire sorter 414, sorted wires 416 extending from the wire sorter 414, and a portion of electrical paddle card 418. The cable assembly 404A-B can also house a crimp ring 406. The crimp ring 406 can be, for example, a hexagonal crimp ring around the jacket of cable 402 that is crimped to at least partially immobilize the jacket of the cable 402 and the braid of wires 412 extending from the cable 402. Moreover, the cable 402 can include a cable boot 422, which can be a strain relief boot attached around the cable 402 and a portion of the crimp ring 406. The cable boot 422 can be at least partially captured by the cable assembly 404A-B to further secure or lock the cable boot 422 in place.

The wire sorter 414 can be a block, such as a plastic block, used to sort and/or align the wires 412 for soldering into the electrical paddle card 418. The wire sorter 414 can receive the wires 412 and sort the wires into a predetermined arrangement to yield the sorted wires 416. The sorted wires 416 can then extend from the wire sorter 414 into the electrical paddle card 418. The sorted wires 416 can be soldered onto the electrical paddle card 418 according to the predetermined arrangement to create an electrical connection between the wires 412 and the electrical paddle card 418. The electrical paddle card 418 can be a printed circuit board (PCB) to mechanically support and electrically connect the cable 402 with a device, such as network device 110, via an electrical connector associated with the device. The electrical paddle card 418 and the electrical connector associated with the device can form a mating connection to support an electrical connection for data transfers, for example. To this end, the electrical paddle card 418 can include a number of circuits to form a connection with an opposing mating connector (not shown).

The cable assembly 404A-B can include a top portion 404A and a bottom portion 404B, which can be attached or coupled together to form an enclosure or backshell, such as backshell 300 as illustrated in FIG. 3. The cable assembly 404A-B can fix or secure the relationship of the electrical paddle card 418, the wire sorter 414, and the wires 412, 416 to the cable assembly 404A-B. Further, the cable assembly 404A-B can include an injection chamber 408, which can be a cavity or aperture in the cable assembly 404A-B. The injection chamber 408 can be at least partially filled with hot-melt that is injected into the injection chamber 408 via access hole 410 on the cable assembly 404A-B. The hot-melt can then mold over the wires 412 to protect, support, lock, and secure the wires 412 in the cable assembly 404A-B. The mold of hot-melt can create a cable diecast inside the cable assembly 404A-B. Moreover, the mold of hot-melt can provide strain relief and at least partially restrict movement of the wires 412 relative to the cable assembly 404A-B.

The mold of hot-melt can also help secure or lock the relationship of the wires 412, the crimp ring 406, and the wire sorter 414. For example, the hot-melt can serve to align the wires 412, the crimp ring 406, and the wire sorter 414, and restrict movement of the wires 412, the crimp ring 406, and/or the wire sorter 414 relative to the cable assembly 404A-B and/or one another. The crimp ring 406 and the wire sorter 414 can also serve as walls or stops for the hot-melt injected into the injection chamber 408. Thus, the crimp ring 406 and the wire sorter 414 can help contain the hot-melt within the injection chamber 408, and prevent the hot-melt from gushing or migrating beyond the injection chamber 408, onto a cable medium or around the cable 402.

In some embodiments, the wires 412 can include a thermal barrier to protect the wires 412 from the hot-melt, without limiting the support, security, alignment, and strain relief provided by the hot-melt. For example, the wires 412 can be covered in a material, such as a tape or a jacket, which has properties that provide thermal protection. In some cases, the wire sorter 414 and/or the sorted wires 416 can also include the thermal barrier to extend thermal protections to the wire sorter 414 and/or the sorted wires 416. For example, a captive tape around the wires 412, 416 and the wire sorter 414 can be used as a thermal barrier to protect the wires 412, 416 and the wire sorter 414 from the hot-melt. In other embodiments, a hot-melt deflection device can be provided in the injection chamber 408 to protect the wires 412 from the hot-melt by deflecting the hot-melt as it is injected into the injection chamber 408 via access hole 410.

Screw 420 can be used to secure the cable assembly 404A-B to a device. For example, the screw 420 can be used to secure the cable assembly 404A-B to the chassis of a switch or network device. The screw 420 can be configured for twisting by hand, with a screw driver, and/or with another twisting tool. The screw 420 can be twisted to lock the cable assembly 404A-B to a device once the electrical paddle card 418 is connected to a connection point on the device, such as a mating connector on the motherboard of the device, to attach the cable 402 to the device and lock the electrical connection.

Figure 5:
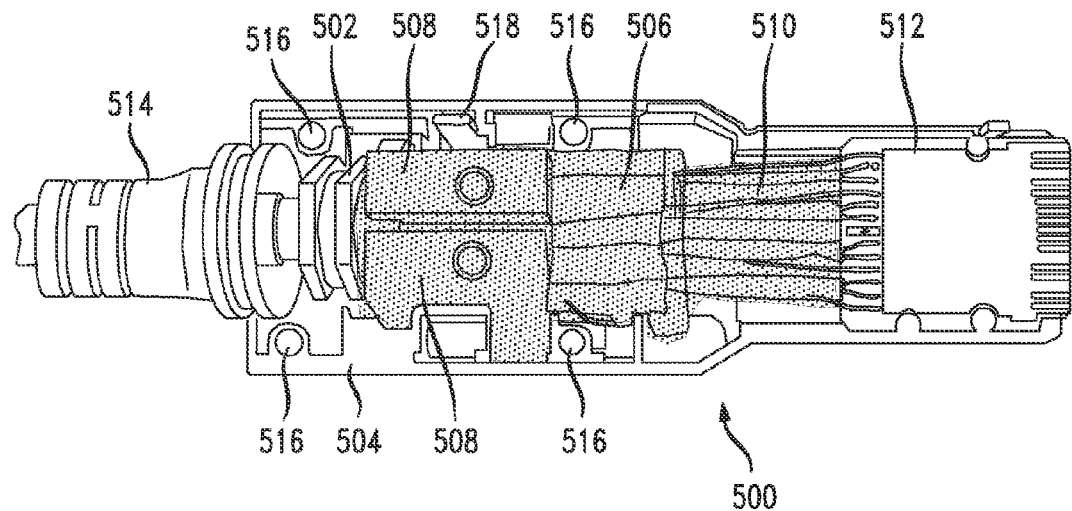
FIG. 5 illustrates a top view of an exemplary cable assembly mechanism with an open diecast backshell.

FIG. 5 illustrates a top view of an exemplary cable assembly mechanism 500 with an open diecast backshell 504. The cable assembly mechanism 500 can include a diecast backshell 504. In FIG. 5, the diecast backshell 504 is illustrated open to expose the internal configuration and components of the diecast backshell 504. However, the diecast backshell 504 can be attached to a complementary diecast backshell to form a closed diecast backshell, such as backshell 300 illustrated in FIG. 3, and capture or contain the various components in the cable assembly mechanism 500. Thus, the diecast backshell 504 can be a bottom backshell that is configured to be attached to a top backshell to form an enclosed backshell. For example, the diecast backshell 504 can be attached to a top backshell (not shown) via ports 516, to form an enclosed diecast backshell, such as backshell 300 illustrated in FIG. 3. When closed, the diecast backshell can encapsulate, capture, and/or house one or more components of the cable assembly mechanism 500, as further described below.

The cable assembly mechanism 500 can include a crimp ring 502, which can crimp the cable jacket and wires in the electrical cable to secure and/or at least partially immobilize the cable and wires. The crimp ring 502 can be captured inside the diecast backshell 504 to secure or lock the crimp ring 502 in the diecast backshell. For example, the diecast backshell 504 can include a cavity to capture the crimp ring 502. The cavity can be configured based on the size and shape of the crimp ring 502, so the crimp ring 502 can fit in the cavity and/or lock inside the cavity. The diecast backshell 504 can include a cavity shaped according to a corresponding portion of the crimp ring 502 to securely attach the corresponding portion of the crimp ring 502 inside a portion of the diecast backshell 504. A top portion of the diecast backshell can be similarly fitted to secure a different portion of the crimp ring 502. The crimp ring 502 can thus be fitted in the diecast backshell and, when closed, the diecast backshell can capture the crimp ring 502 securely.

A cable boot 514 can be placed around the cable and a portion of the crimp ring 502 to provide strain relief, and further secure the cable to the diecast backshell 504. The cable diecast 508 can be held or captured within a cavity in the diecast backshell 504, to lock, secure, and/or align the wires from the cable, the crimp ring 502, and/or the wire sorter 506. The cable diecast 508 can be formed by injecting hot-melt into the cavity in the diecast backshell 504.

The wire sorter 506 can similarly be held within a cavity in the diecast backshell 504 to secure the wire sorter 506 in place, as well as the wires in the wire sorter 506. The wire sorter 506 can also serve as a wall or hot-melt stop to prevent injected hot-melt from spilling or migrating into sorted wires 510 extending from the wire sorter 506, or the electrical paddle card 512 connected to the sorted wires 510. The wire sorter 506 can also arrange the wires from the cable according to a specific arrangement used to connect the wires to the electrical paddle card 512. For example, the wire sorter 506 can align the wires 510 from the cable to the electrical paddle card 512 to form a connection point with the electrical paddle card 512. The sorted wires 510, once sorted, arranged, and/or aligned by the wire sorter 506, can be secured in place or at least partially immobilized by the diecast backshell. For example, a bottom portion of the sorted wires 510 can extend from the wire sorter 506 and run along a path on the diecast backshell 504 to a connection point in the electrical paddle card 512. The sorted wires 510 can then be soldered or otherwise connected to the electrical paddle card 512, and secured in place by the wire sorter 510, the connection point on the electrical paddle card 512, and the diecast backshell.

In some embodiments, the diecast backshell 504 can include a tab 518 that extends into a path of a screw (e.g., screw 420 in FIG. 4) used to attach the diecast backshell to a device. The tab 518 can then cause the screw to be locked into place or otherwise prevent the screw from falling when loose. In some embodiments, the tab 518 limits the screw to a range of motion when the diecast backshell 504 is attached to a top diecast backshell to form an enclosed diecast backshell, such as backshell 300 in FIG. 3.

Figure 6:
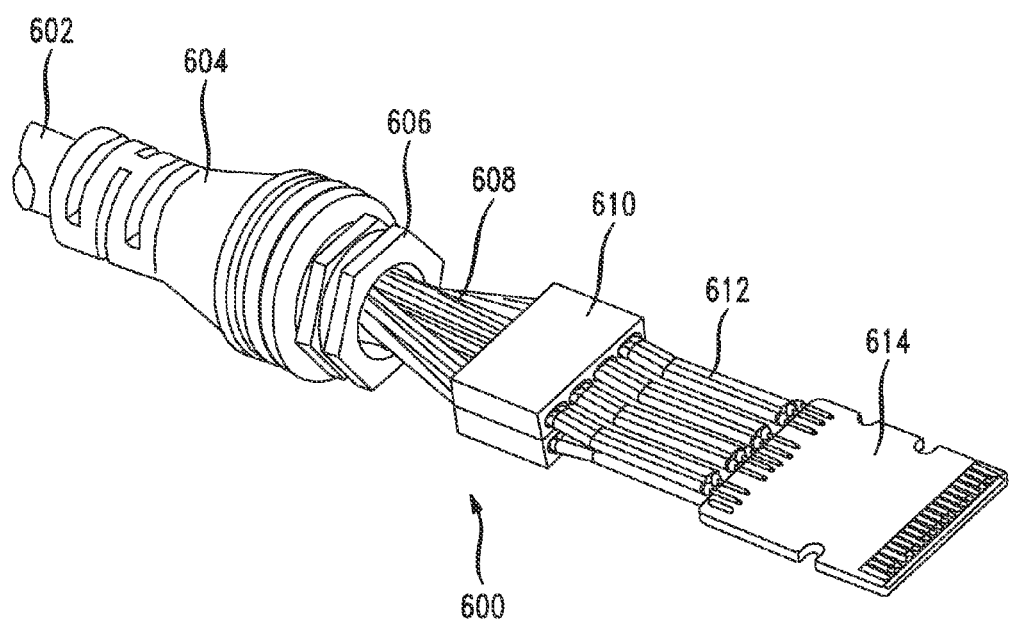
FIG. 6 illustrates an exemplary configuration of a cable for attachment to a cable assembly.

FIG. 6 illustrates an exemplary configuration 600 of a cable 602 for attachment to a cable assembly. Here, the configuration 600 can include the various cable components housed in a diecast backshell, such as backshell 300 in FIG. 3. Moreover, the configuration 600 can include the cable 602, which can be attached to a cable assembly, such as cable assembly mechanism 400 illustrated in FIG. 4.

The cable 602 can include a cable boot 604 around the cable 602. The cable boot 604 can provide strain relief and support to the cable 602. The cable 602 can be crimped with a crimp ring 606 attached to the end of the cable 602, to secure the cable 602 and prevent or limit rotation of the cable 602, which can damage the wires 608 in the cable 602. The wires 608 can extend from the cable 602 and into a wire sorter 610. The wire sorter 610 can be a block configured to receive the wires 608, and sort, arrange, and/or channel the wires 608 according to a specific configuration to yield sorted wires 612, which can be arranged for connecting to the electrical paddle card 614. In some embodiments, the wire sorter 610 can be a plastic block configured to receive the wires 608 and arrange the wires 608 according to a predetermined arrangement for connecting the sorted wires 612 to the electrical paddle card 614. In some cases, the sorted wires 612 can be soldered into the electrical paddle card 614 according to their arrangement established by the wire sorter 610. Once soldered, the sorted wires 612 can establish an electrical connection to the electrical paddle card 614 to support electrical communications or signals between the wires 608, 612 and the electrical paddle card 614.

The electrical paddle card 614 can be a printed circuit board for connecting the cable 602 to a separate device, such as a switch or a router. As previously explained, the electrical paddle card 614 can include circuits for forming a connection with a corresponding mating component on the separate device. For example, the electrical paddle card 614 can be configured to form a mating connection with a mating connector at an electrical board or printed circuit board on a switch.

The configuration 600 of the cable 602 can be contained or captured inside a diecast backshell as previously described. The diecast backshell can protect, secure, align, and/or at least partially immobilize one or more of the components in the configuration 600. After the diecast backshell is attached to the configuration 600, hot melt can be injected into the diecast backshell to further protect, secure, align, and/or immobilize the components in the configuration 600.

Figure 7:
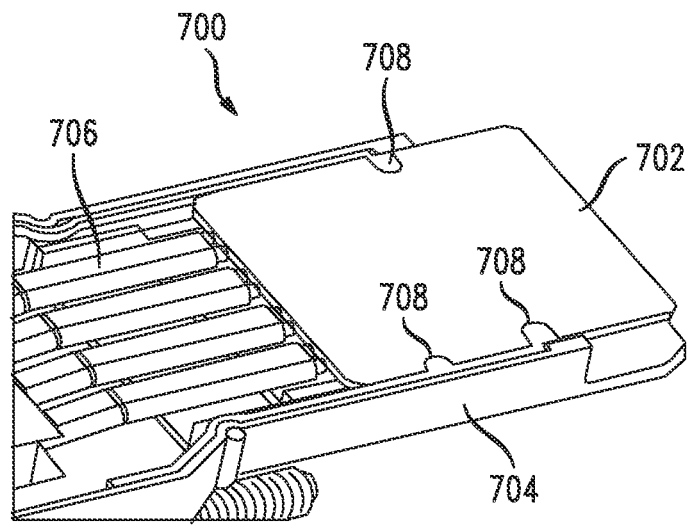
FIG. 7 illustrates an exemplary configuration of a paddle card.

FIG. 7 illustrates an exemplary configuration 700 of a paddle card 702. The paddle card 702 can be a circuit card or PCB. Moreover, the paddle card 702 can be connected to the cable wires 706 to support an electrical connection between the cable wires 706 and a terminal. The wires 706 can be, for example, copper wires or any other current-carrying conductor. Indeed, in some cases, the wires 706 can rather be fiber wires.

The paddle card 702 can be held within the diecast backshell 704. The diecast backshell 704 can include diecast intrusions 708 to hold, lock, or immobilize the electrical card 702. The diecast intrusions 708 can secure the paddle card 702 in the diecast backshell 704. The diecast intrusions 708 can fit within cavities in the paddle card 702 shaped to hold the diecast intrusions 708. In some embodiments, the diecast intrusions 708 can clamp or fasten the paddle card 702 to secure the paddle card 702 within the diecast backshell 704. In other embodiments, the diecast intrusions 708 can overlap over a portion of the paddle card 702 to hold or secure the paddle card 702 in place within the diecast backshell 704.

As previously explained, the diecast intrusions 708 can immobilize or limit the movement of the paddle card 702 within the diecast backshell 704. This can help prevent damage to the paddle card 702 and/or the wires 706 from force and/or movement. The diecast backshell 704 can also help secure, protect, immobilize, and/or align the paddle card 702 to further prevent damage to the paddle card 702 and/or the wires 706. The diecast intrusions 708 can be made from one or more metals. However, as one of ordinary skill in the art will readily recognize, other materials, such as rubber or plastic, can be used to create the intrusions 708. Thus, while the intrusions 708 are described herein as diecast intrusions, other embodiments and/or compositions of the intrusions 708 are contemplated herein.

Figure 8:
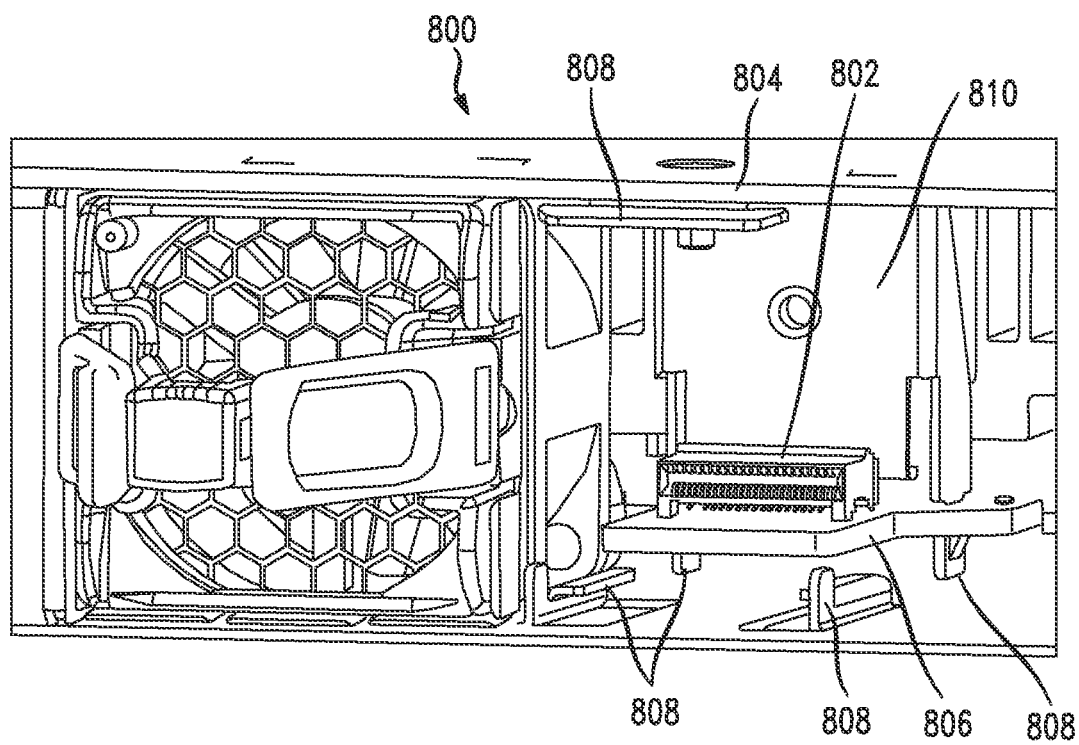
FIG. 8 illustrates an exemplary mechanical support in a communications device for an electrical connection.

FIG. 8 illustrates an exemplary mechanical support 800 in a communications device for an electrical connection. The communications device can be a high-speed communications device, such as a switch or a router. For example, the communications device can be a network device 110 or a system 200, as illustrated above in FIGS. 1 and 2, respectively. The communications device can include a printed circuit board (PCB) 806 with an electrical connector 802 for connecting the communications device to an electrical cable. In some embodiments, the printed circuit board 806 can be part of the motherboard of the communications device. In other embodiments, the electrical connector 802 can be part of an interface card on the communications device. Moreover, the electrical connector 802 can be, for example, a mating connector for forming a mating connection with a paddle card coupled to an electrical cable, such as paddle card 702 illustrated in FIG. 7. Further, the electrical connector 802 can be a circuit connector configured to be hot-swappable and/or hot-pluggable.

The system chassis 804 can house the PCB 806 and electrical connector 802. Moreover, the system chassis 804 can include an opening 810 to provide access to the electrical connector 802. The opening 810 can be configured to allow an electrical cable to connect to the electrical connector 802 and/or allow an adapter to be placed, secured, fitted, positioned, and/or aligned within the opening 810 in the system chassis 804. The opening 810 can form a receptacle or cage for different cable assemblies or applications. To this end, the opening 810 can be large enough to receive communications components, such as cables and adapters, of different sizes and form factors, such as Quad Small Form-Factor Pluggable (QSFP or QSFP+), Small Form-Factor Pluggable (SFP), CXP, High Speed Serial Data Connection (HSSDC or HSSDC2), etc. For example, the opening 810 can be large enough to fit QSFP adapters, SFP adapters, CXP optical modules, Direct Attach Cables (DAC), mechanical attachments, etc.

The system chassis 804 can include structures 808 to provide support and alignment for the various types of connections, attachments, form factors, etc. For example, the structures 808 can provide vertical and/or horizontal alignment and sizing based on the specific attachment or module used for the high-speed communication. In some embodiments, the structures 808 can be adjusted or moved along an X axis, a Y axis, and a Z axis to adjust the width, length, depth, and/or azimuth of the receptacle or cage formed by the opening 808 and chassis 804. Thus, the structures 808 can be adjusted to fit, position, or secure any type of module, adapter, or cable assembly within the opening 808. This way, a specific connection can be upgraded or replaced with ease and flexibility, without need or use of alternate and additional connectors or interfaces. The communications device can thus support multiple types of connections, components, and form factors. The mechanical support 800 can adapt to a wide-variety of cables without requiring different receptacles and/or cages for each separate form factor. Accordingly, the mechanical support 800 can serve as a universal solution, which can even be adapted for future form factors that have yet to be invented.

In some embodiments, a mechanical attachment that can support multiple interchangeable components, as further described below, can be supported by the mechanical support 800. Such mechanical attachment can be attached to the system chassis 804 via the opening 810 and structures 808. The mechanical attachment can be attached to the system chassis 804 to provide support for varying types of connections, including pass-through connections. The mechanical attachment can be a universal or one-size-fits-all attachment, which, together with the mechanical support 800 in the system chassis 804, can engage or support components based on a wide variety of form factors. This way, the various configurations and connections used with the electrical connector 802 can be interchangeable and field upgradeable based on the capabilities of the mechanical attachment and the mechanical support 800. Thus, different electrical cables having varying cable assemblies or attachments can be directly connected to the electrical connector 802 without an intermediate, electrical connection. By reducing the number of electrical connections (i.e., connection points), the connection can better maintain the signal integrity and connection stability.

Further, in some cases, the structures 808 can be adapted to secure, fasten, lock, or attach the communications component used in a specific connection to the system chassis 804. For example, the structures 808 can be configured such that the communications component positioned in the opening 810 can snap in place when the structures 808 are adapted to the specific component's fit. The communications component positioned in the opening 810 can also be locked or secured by fitting or tightening the component in the opening 810 on the system chassis 804, and/or by using one or more additional structures such as tabs, screws, gears, plugs, molds, bonds, clasps, etc. For example, a clasp can be added to the system chassis 804 to secure a communications component used in a connection.

Figure 9:
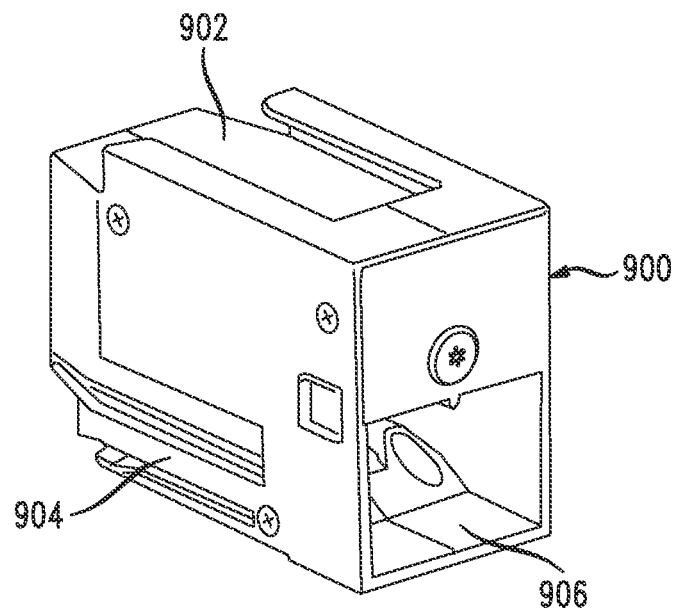
FIG. 9 illustrates an exemplary mechanical attachment.

FIG. 9 illustrates an exemplary mechanical attachment 900. The mechanical attachment 900 can be attached to a device using the mechanical support 800 illustrated in FIG. 8. For example, the mechanical attachment 900 can be inserted into the opening 810 in the system chassis 804, and engaged, positioned, secured, and/or aligned using the structures 808.

The mechanical attachment 900 can be a diecast block. Moreover, the mechanical attachment 900 can include multiple interlock features 902-906. The interlock features 902-906 can provide lateral and vertical retention, longitudinal insertion guidance, and alignment with the system chassis 804 and the PCB 806. In particular, the mechanical attachment 900 can be rigidly attached or secured via the interlock features 902-906. For example, the structures 808 can be adjusted according to the interlock features 902-906, to secure, guide, attach, fasten, and align the mechanical attachment 900 in the system chassis 804. In some cases, the mechanical attachment 900 can also be attached via one or more locking components, such as tabs or screws.

The mechanical attachment 900 can provide mechanical support for various types of cables and cable assemblies. To this end, the particular cables used in a high-speed connection can connect directly to the PCB at the device using the mechanical attachment 900. Here, the mechanical attachment 900 can be used as a receptacle for the cable, which can be connected to the PCB at the device without additional electrical connections. Thus, the mechanical attachment 900 can provide mechanical support for pass-through connectivity, and limit the connection points to one.

Figure 10:
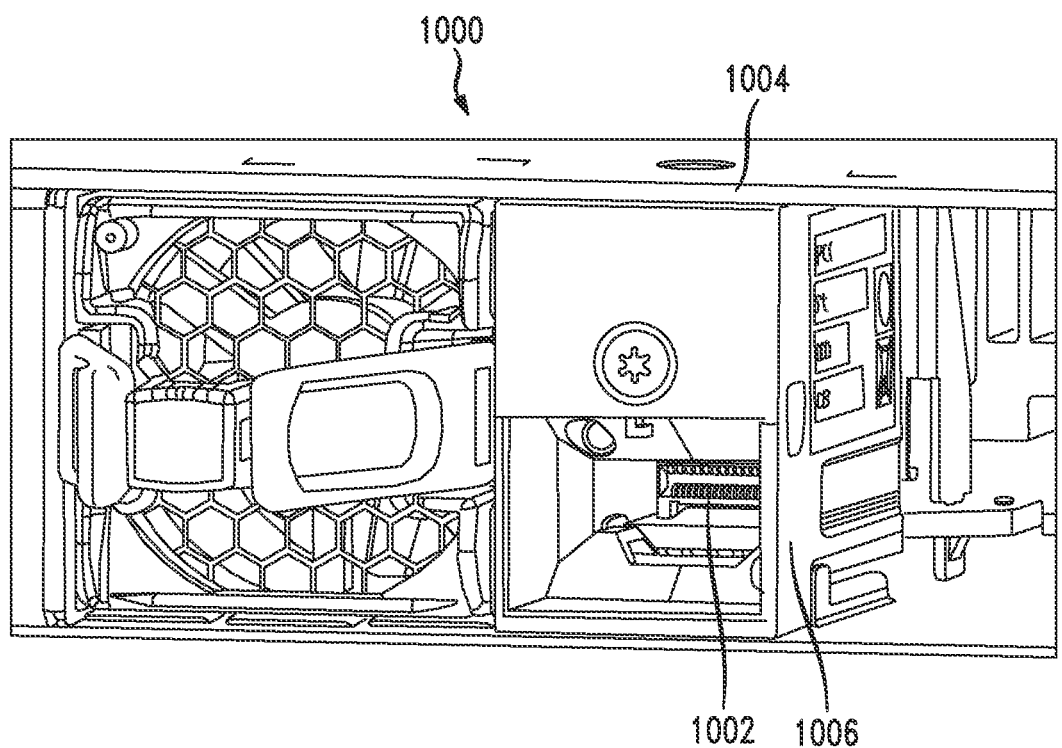
FIG. 10 illustrates an exemplary configuration of a mechanical attachment in an installed position.

FIG. 10 illustrates an exemplary configuration 1000 of a mechanical attachment 1006 in an installed position. The mechanical attachment 1006 can be a mechanical attachment as illustrated in FIG. 9. The mechanical attachment 1006 can be attached to the system chassis 1004 to provide field-configurable mechanical support for various types of cables and media connections. When attached, the mechanical attachment 1006 can align and/or position the cable for connection to the electrical connector 1002 in the PCB of the device. The mechanical attachment 1006 can thus secure the electrical cable to the system chassis 1004 and the electrical connector 1002. The mechanical attachment 1006 can also be adjusted for the specific type of cable used in the connection. For example, if the mechanical attachment 1006 is used to connect a specific type of cable to the connector 1002, and the specific cable is later upgraded to a different type of cable, the mechanical attachment 1006 can then be adjusted to engage or receive the different cable. Thus, the mechanical attachment 1006 can provide wide support for different cables and connections, without requiring alternate attachments.

Figure 11:
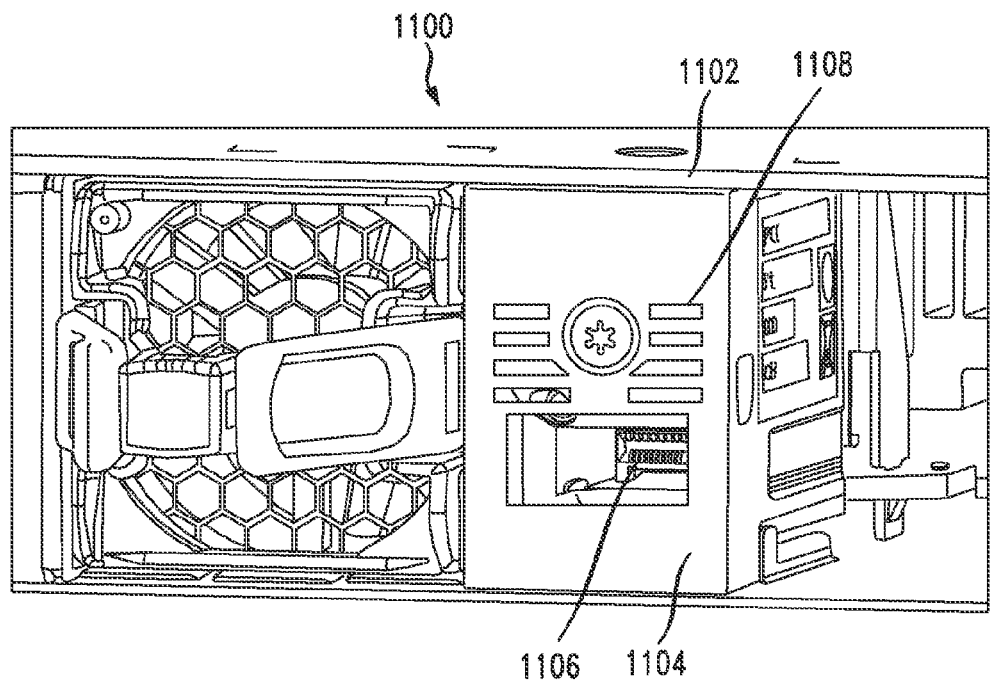
FIG. 11 illustrates another exemplary configuration of a mechanical attachment in an installed position.

FIG. 11 illustrates another exemplary configuration 1100 of a mechanical attachment 1104 in an installed position. The mechanical attachment 1104 can be attached to the system chassis 1102 in alignment with the electrical connector 1106 as previously described with respect to FIGS. 9 and 10. In this configuration, the mechanical attachment 1104 includes thermal features 1108 to provide additional thermal properties. The features 1108 can include openings for air to flow in and out of the mechanical attachment 1104. Such air flow can provide thermal properties to the mechanical attachment 1104. For example, the features 1108 can allow hot air to escape the mechanical attachment 1104 and system chassis 1102 to reduce the amount of hot air, and thus the temperature, around the electrical components, such as the electrical connector 1106. In some cases, the features 1108 can provide ventilation ports to reduce the risk of overheating of electrical components within the mechanical attachment 1104 and the system chassis 1102.

Figure 12:
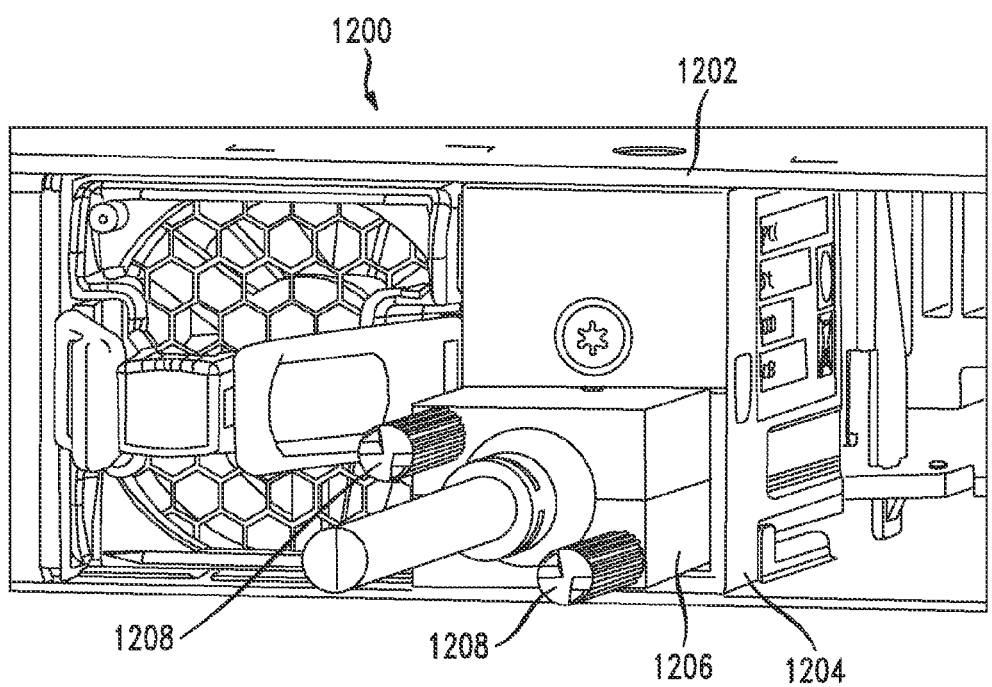
FIG. 12 illustrates an exemplary configuration of a cable attachment.

FIG. 12 illustrates an exemplary configuration of a cable attachment 1200. The cable 1206 is attached to the mechanical attachment 1204 in the system chassis 1202. In this configuration, the cable 1206 is secured to the mechanical attachment 1204 using thumbscrews 1208. The thumbscrews 1208 can provide long-term, positive mechanical engagement. Moreover, the cable 1206 can be attached to a PCB (not shown) in the device via the mechanical attachment 1204. Here, the mechanical attachment 1204 can be adjusted according to the cable 1206, to secure, align, engage, and attach the cable 1206 to the PCB on the device.

Figure 13:
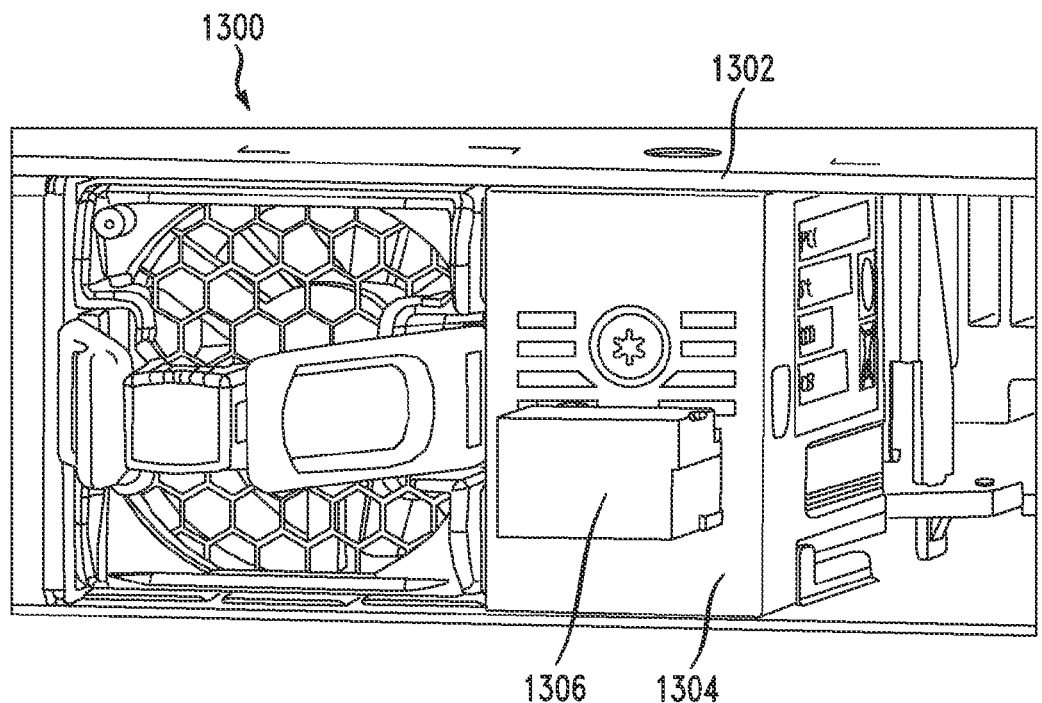
FIG. 13 illustrates an exemplary configuration of a mechanical attachment with snap-in retention.

FIG. 13 illustrates an exemplary configuration 1300 of a mechanical attachment 1304 with snap-in retention. The mechanical attachment 1304 can be attached to the system chassis 1302 as previously explained. The module 1306 can then be attached to the mechanical attachment 1304 using snap-in retention. A cable can also be attached to the mechanical attachment using snap-in retention. The cable here can then connect to the connector on the PCB of the device while maintaining an attachment to the mechanical attachment 1304 via the snap-in retention.

Figure 14:
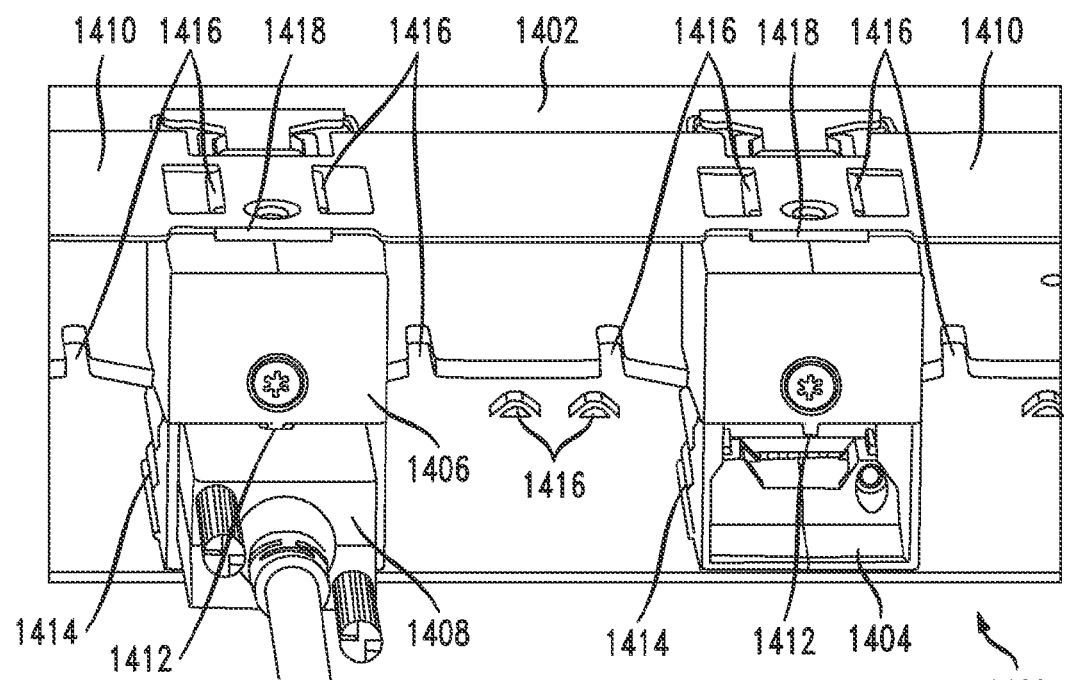
FIG. 14 illustrates an exemplary configuration for field-configurable mechanical support.

FIG. 14 illustrates an exemplary configuration 1400 for field-configurable mechanical support. The configuration 1400 can include mechanical attachments 1404, 1406 for supporting multiple connections to the device. The mechanical attachments 1404, 1406 can be attached to the system chassis 1402 using guiderails 1410 and 1414, and attachment features 1416. The guiderails 1410 and 1414 can be configured to use outward or inward engagement to secure or attach the mechanical attachments 1404, 1406. Moreover, the topside guiderails 1410 can include topside stops 1418 for further securing the mechanical attachments 1404, 1406. The topside stops 1418 can include rearward or inward engagement. The mechanical attachments 1404, 1406 can also include complementary slots to engage the topside stops 1418.

The mechanical attachments 1404, 1406 can also include keying features 1412 to engage compatible cables. For example, mechanical attachment 1406 can include keying feature 1412 to engage the cable 1408. The keying features 1412 can include a protrusion from the mechanical attachments 1404, 1406 which can engage compatible cables having a complementary slot for the keying features 1412. However, in other embodiments, the keying features 1412 can instead be a slot for receiving a complementary keying feature in a cable.

Figure 15:
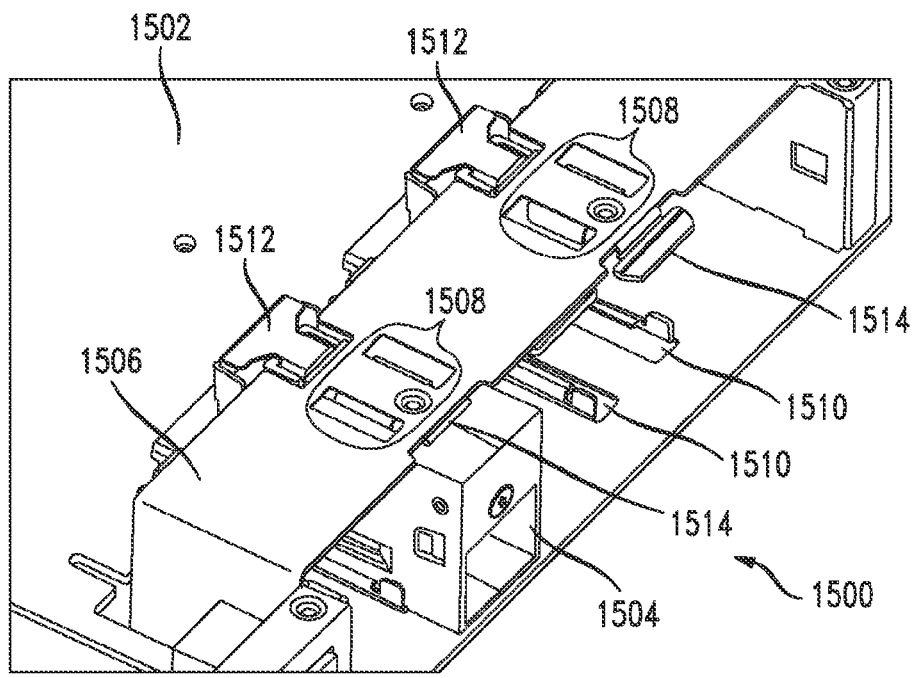
FIG. 15 illustrates an exemplary configuration of a system chassis with topside guiderails for field-configurable mechanical support.

FIG. 15 illustrates an exemplary configuration 1500 of a system chassis 1502 with topside guiderails 1506 for field-configurable mechanical support. The topside guiderails 1506 can provide alignment for the mechanical attachment 1504. The topside guiderails 1506 can form an upper wall of a receptacle or cage for attaching the mechanical attachment 1504. The topside guiderails 1506 can include engagement features 1508, 1512, and 1514 for engaging the mechanical attachment 1504. The top engagement features 1508 can include outward or inward engagements configured to engage (or attach to) a complementary slot(s) on the mechanical attachment 1504. Similarly, the topside stop 1514 can engage a complementary slot(s) on the mechanical attachment 1504 to further secure the mechanical attachment 1504 to the system chassis 1502.

The vertical justification spring element 1512 can provide vertical justification of the PCB on the device. The vertical justification spring element 1512 can include legs (not shown) that protrude through the PCB on the device and tabs that engage with the PCB on the device. The vertical justification spring element 1512 can then pull-up on the PCB using the topside guiderails 1506 as a support and source of torsional spring force.

In some cases, the vertical justification spring element 151 can also serve as rear engagement features. The rear engagement features here can form a rear stop or wall to further secure the mechanical attachment 1504 and prevent the mechanical attachment 1504 from sliding or moving deeper into the system chassis 1502. The rear engagement features can also be adjusted to adapt to the length of the cable or assembly attached to the mechanical attachment 1504 and align the connector in the cable with the connector in the PCB of the device.

The system chassis 1502 can further include bottom rails 1510 to align and secure the mechanical attachment 1504 to the system chassis 1502. The mechanical attachment 1504 can be attached or locked into the bottom rails 1510, and the bottom rails 1510 can be adapted to place the mechanical attachment 1504 into position for a connection point based on the form factor of the cable used for a specific connection.

Figure 16:
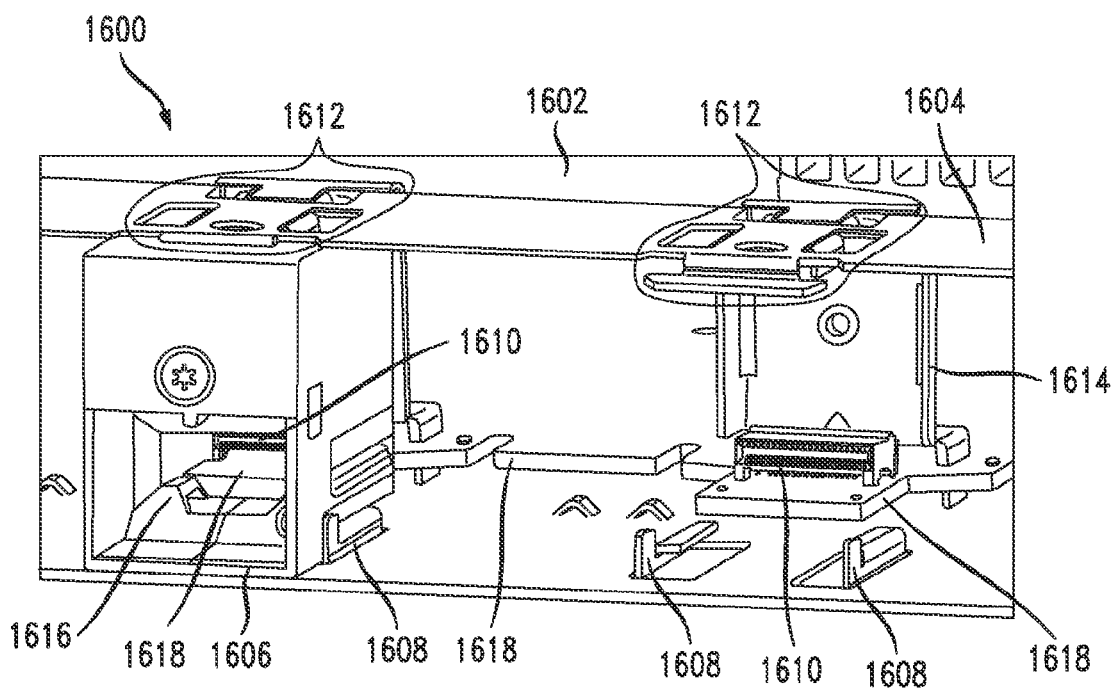
FIG. 16 illustrates an exemplary configuration of a system chassis with bottom-side guiderails for field-configurable mechanical support.

FIG. 16 illustrates an exemplary configuration 1600 of a system chassis 1602 with bottom-side guiderails for field-configurable mechanical support. The bottom-side guiderails 1608 can secure and align the mechanical attachment 1606 to the system chassis 1602. The bottom-side guiderails 1608 can also help align the mechanical attachment 1606 to the respective electrical connector 1610 and the board 1618. As illustrated, the bottom-side guiderails 1608 can include inward engagement. However, in other embodiments, the bottom-side guiderails 1608 can include outward engagement.

The configuration 1600 can also include top-side rails 1604 as previously described in FIG. 15. Moreover, the configuration 1600 can include backside guiderails 1614 to form a backside wall between the mechanical attachment 1606 and the board 1618. In addition, the top engagement features 1612 can include outward or inward engagements configured to engage (or attach to) a complementary slot(s) on the mechanical attachment 1606.

The mechanical attachment 1606 can be secured or attached on the system chassis 1602 via the guiderails 1604 and 1608, the top engagement features 1612, and the backside guiderails 1614. The mechanical attachment 1606 can include features 1616 for stopping the mechanical attachment 1606 when the mechanical attachment 1606 is fully engaged against the board 1608. The features 1616 can face the board 1618 to serve as a stop or block for the mechanical attachment 1606.

Figure 17:
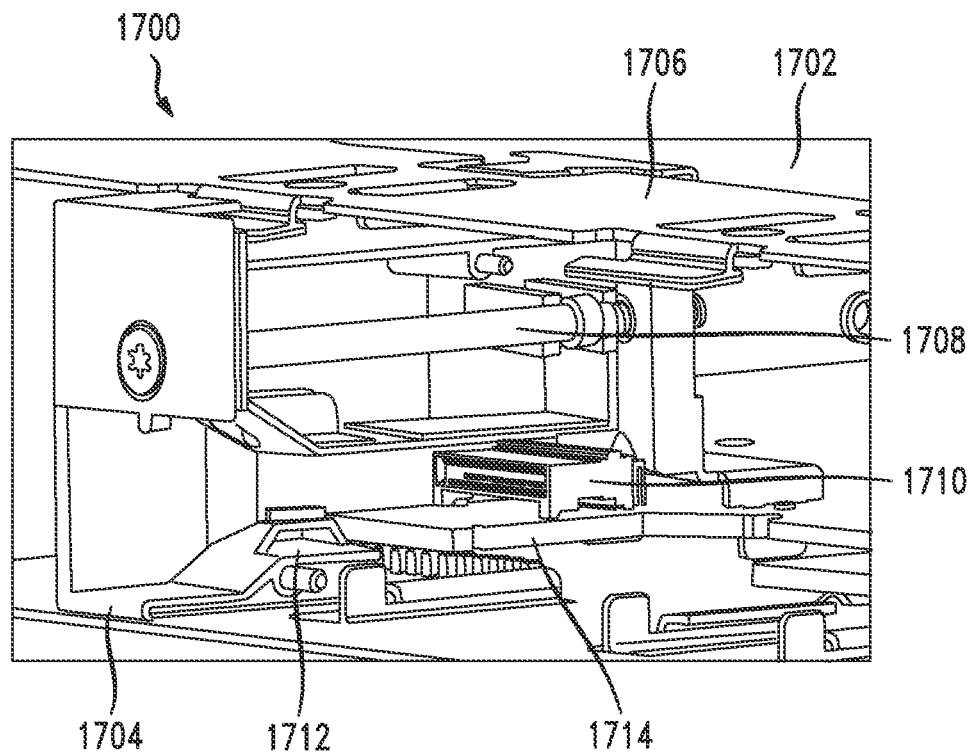
FIG. 17 illustrates an exemplary configuration of a mechanical attachment with a captive screw.

FIG. 17 illustrates an exemplary configuration 1700 of a mechanical attachment 1704 with a captive screw 1708. As previously explained, the mechanical attachment 1704 can align a corresponding cable with the connector 1710 coupled to the board 1714 on the system chassis 1702. The mechanical attachment 1704 can be attached to the system chassis 1702 and secured to the top-side guiderails 1706. Moreover, the mechanical attachment 1704 can include features 1712 for stopping the mechanical attachment 1704 when fully engaged against the board 1714.

The mechanical attachment 1704 can also include a captive screw 1708. The captive screw 1708 can prevent aggressive insertion and reduce insertion force requirements. This can be accomplished by the captive screw 1708 blocking full insertion. In some embodiments, the captive screw 1708 can be required to turn to its limit to fully engage the mechanical attachment 1704. The captive screw 1708 can also provide longitudinal retention of the mechanical attachment 1704. In some cases, when reversed, the captive screw 1708 can release longitudinal retention and function as an ejector, allowing a sufficient amount of the mechanical attachment 1704 to protrude from the system chassis 1702 to allow a user to easily grip the mechanical attachment 1704 to fully remove it.

Figure 18:
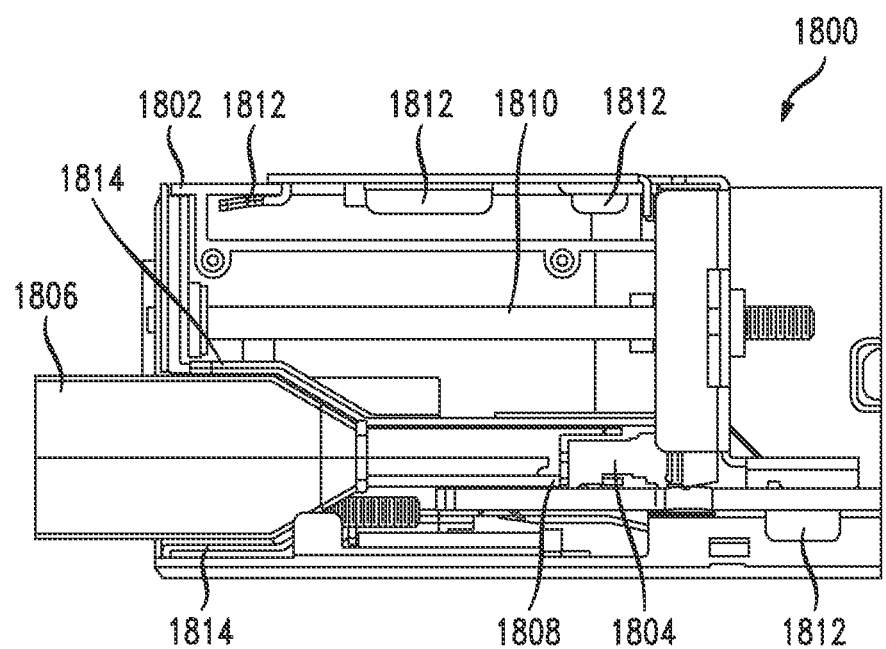
FIG. 18 illustrates an exemplary configuration of mating components in a high-speed electrical connection.

FIG. 18 illustrates an exemplary configuration 1800 of mating components in a high-speed electrical connection. Here, the mechanical attachment 1802 is connected to the system chassis via engagements 1812. The mechanical attachment 1802 additionally includes a captive screw 1810 to further secure the mechanical attachment 1802 to the system chassis.

The mechanical attachment 1802 can align the cable in the cable assembly 1806 for connection with the connector 1804 in the system board. The paddle card 1808 from the cable assembly 1806 can mate with the connector 1804 to establish an electrical connection between the cable and the device. The mechanical attachment 1802 can engage the cable assembly 1806 and provide a rigid attachment between the mechanical attachment and the cable assembly 1806. The cable assembly 1806 can be inserted into an aperture 1814 in the mechanical attachment 1802 to secure and/or attach the cable assembly. In some cases, the aperture 1814 can reduce in size towards the electrical mating point to provide mating guidance and/or further secure the cable assembly 1806.

Figure 19:
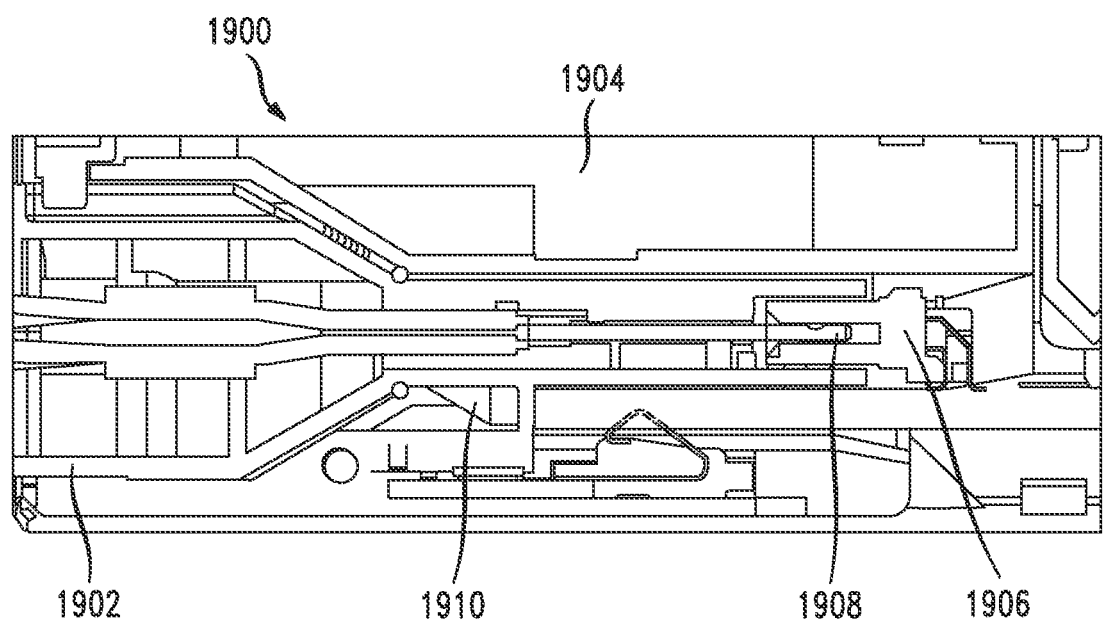
FIG. 19 illustrates an exemplary mating configuration.

FIG. 19 illustrates an exemplary mating configuration 1900. The mechanical attachment 1904 can receive the cable assembly 1902 as previously described in FIG. 18. The mechanical attachment 1904 can guide the cable assembly to provide mating guidance and align the paddle card 1908 in the cable with the mating connector 1906 coupled to the system board. As shown in the mating configuration 1900, the mechanical attachment 1904 can include a stop feature 1910. The stop feature 1910 can be a guard in the mechanical attachment 1904 to prevent over-insertion of the cable, the cable assembly 1902, or the paddle card 1908 into the system chassis or the mating connector 1906. The stop feature 1910 can interface with the board on the device to prevent over-insertion.

In some embodiments, the mechanical mating components can be loose-fitting to avoid damage of the components. The electrical mating surface can be relied upon to provide final lateral and/or vertical alignment of the paddle card 1908 and/or the mating connector 1906, for example. In other embodiments, the mating configuration 1900 can include a vertical PCB justification spring to further secure the connection and provide flexibility. The vertical PCB justification spring can prevent displacement or loosening and support external forces applied to the connection point. The vertical PCB justification spring in the mating configuration 1900 can be configured according to the vertical justification spring element 1512, as illustrated in FIG. 15, for example.

Figure 20:
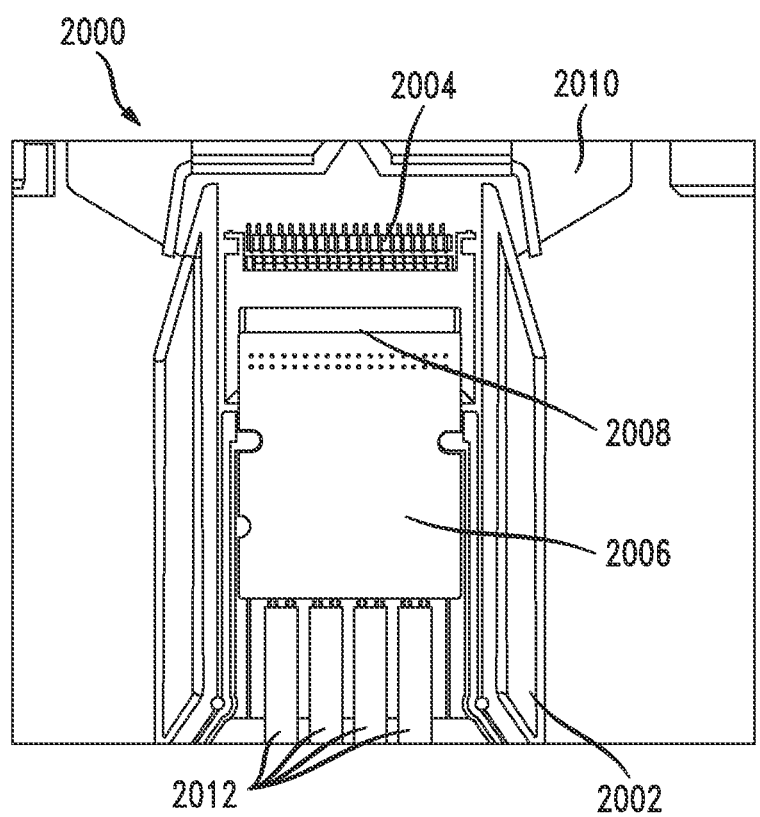
FIG. 20 illustrates an example of mechanical mating components in an installed configuration.

FIG. 20 illustrates an example of mechanical mating components 2000 in an installed configuration. The mechanical mating components 2000 can include a mechanical attachment 2002 encapsulating a paddle card 2006 connected to the mating connector 2004 on the board 2010. The paddle card 2006 and mating connector 2004 can be aligned and attached as necessary to form a mating connection. The paddle card 2006 can engage the opposing mating connector 2004 in order to connect the conductive terminals in the mating connector 2004 to the wires 2012 of the cable. In some embodiments, the mechanical mating components 2000 can be securely fit to avoid displacement or loosening and to support external forces applied to the mating point.

Figure 21:
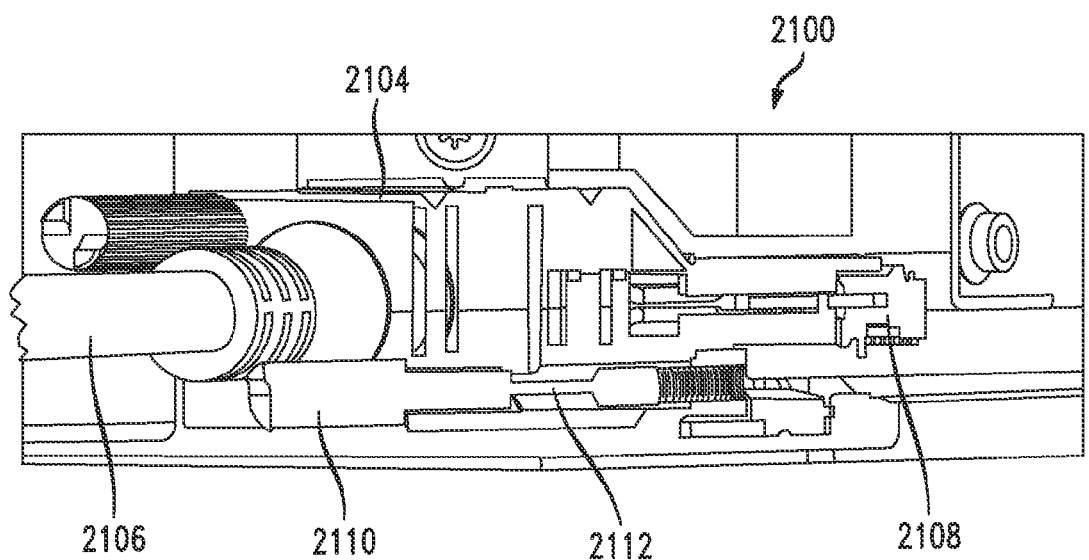
FIG. 21 illustrates an exemplary mating connection secured with a screw.

FIG. 21 illustrates an exemplary mating connection 2100 secured with a screw 2110. Here, the mechanical attachment 2104 is coupled to the cable 2106 which is connected to the connector 2108 on the device. The mechanical attachment 2104 can include a cavity 2112 for housing and receiving screw 2110. The cavity 2112 can provide lateral and/or vertical clearance for the screw 2110.

Once electrical mating has occurred, the screw 2110 can be employed to engage with the mechanical attachment 2104, to provide positive, stable mating of the mating components.

Figure 22:
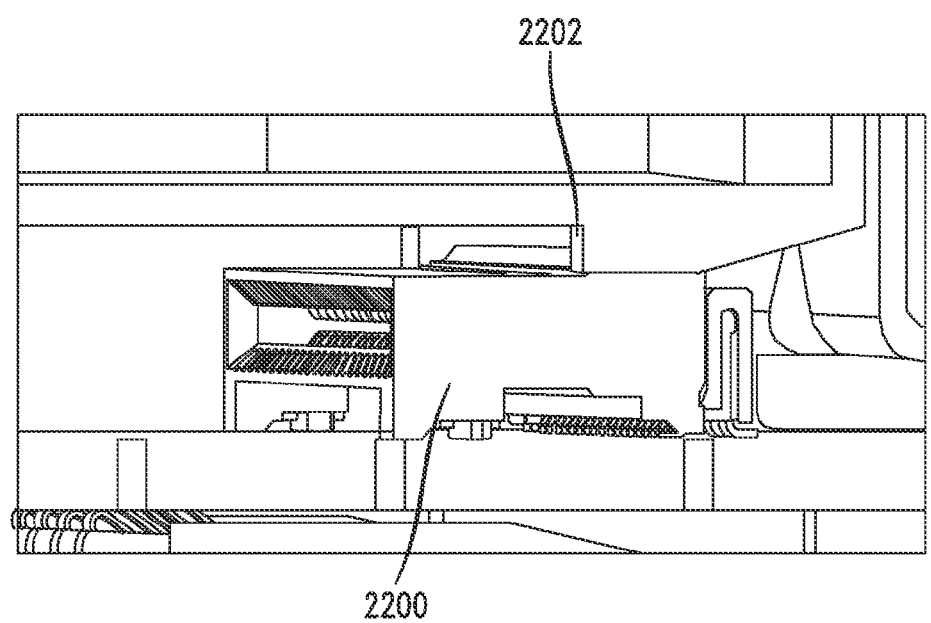
FIG. 22 illustrates an exemplary mechanical attachment with a wedge element for securing the connector against the system board.

FIG. 22 illustrates an exemplary mechanical attachment with a wedge element 2202 for securing the connector 2200 against the system board. The wedge element 2202 can be included on either end of the connector 2200 to secure the fragile high-speed connector against the board and prevent vertical displacement during cable plugging and unplugging.

Figure 23:
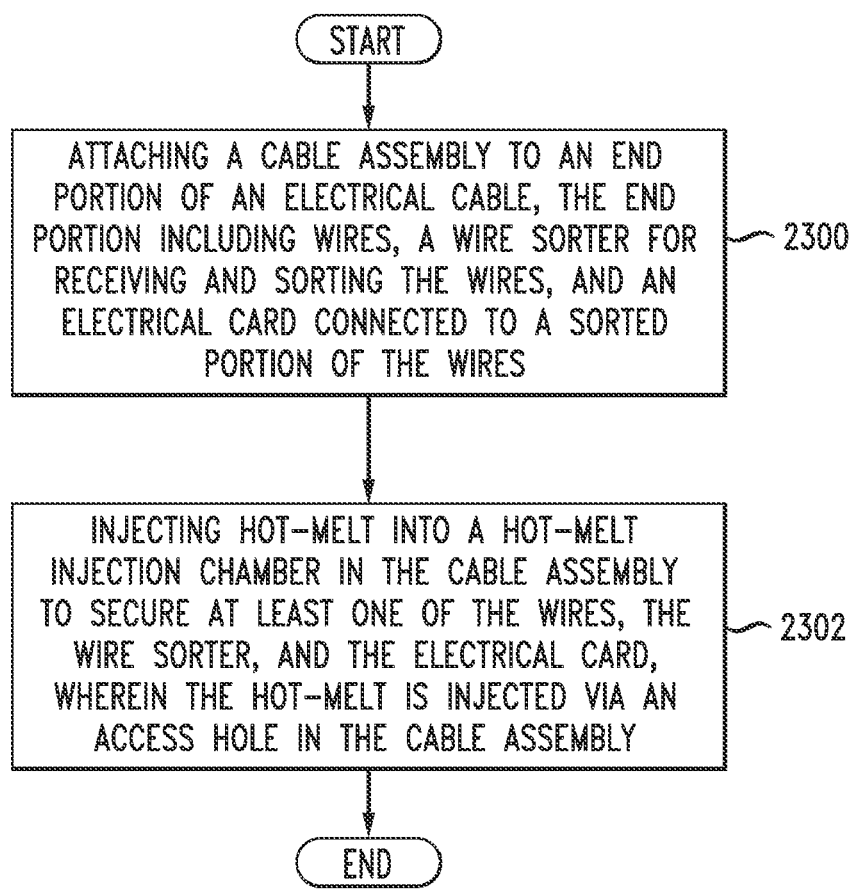
FIG. 23 illustrates an exemplary method embodiment.

Having disclosed some basic system components and concepts, the disclosure now turns to the exemplary method embodiment shown in FIG. 23. The steps outlined herein are exemplary and can be implemented in any combination thereof, including combinations that exclude, add, or modify certain steps.

At step 2300, a cable assembly is attached to an end portion of an electrical cable, the end portion including wires, a wire sorter for receiving and sorting the wires, and an electrical card connected to a sorted portion of the wires. The electrical card can be a paddle card for connecting the electrical cable to a mating connector on a device, such as a switch. Moreover, the sorted portion of wires can be the wires extending from the wire sorter after the wires are received and sorted by the wire sorter. The wire sorter can be a block for receiving and sorting the wires according to a predetermined arrangement. The predetermined arrangement can be based on the expected connection to the paddle card and/or the type of connection, for example. The cable assembly can include a diecast backshell, such as backshell 300 illustrated in FIG. 3. Further, the electrical cable can be any high-speed electrical cable, such as a copper cable.

At step 2302, hot-melt is injected into a hot-melt injection chamber in the cable assembly to secure at least one of the wires, the wire sorter, and the electrical card, wherein the hot-melt is injected via an access hole in the cable assembly. Here, the hot-melt can be injected into the hot-melt injection chamber after the cable assembly is attached to the end portion of the electrical cable. Thus, the hot-melt can be injected post-assembly to provide a custom mold of the cable and components inside the cable assembly.

The hot-melt injection chamber can be a cavity or hollow portion in the cable assembly. Moreover, the cavity can house or encapsulate the wires. When injected with hot-melt, the cavity can be at least partially filled with the hot-melt, which then creates a mold inside the cavity and over the wires. The mold can form a diecast cable mold inside the cavity. The diecast cable mold can limit movement of the wires inside the cable assembly. For example, the diecast mold can immobilize (at least to a degree) the wires and provide strain relief.

In some embodiments, a crimp ring is also attached around a cable jacket of the electrical cable. The crimp ring can be, for example, a hexagonal crimp ring. The crimp ring can crimp the cable jacket and a cable braid extending from the electrical cable housed in the cable assembly. The crimp ring can also immobilize (at least to a degree) the cable jacket and/or cable braid crimped. The crimp ring can be secured to the cable assembly and captured by the hot-melt such that the crimp ring forms a wall of the hot-melt injection chamber. This way, the crimp ring can serve as a hot-melt stop and prevent hot-melt from migrating passed the crimp ring and into the electrical cable when the hot-melt is injected into the hot-melt injection chamber. In some cases, the wire sorter can also form another wall in the hot-melt injection chamber, and similarly serve as a hot-melt stop.

For clarity of explanation, in some instances the present technology may be presented as including individual functional blocks including functional blocks comprising devices, device components, steps or routines in a method embodied in software, or combinations of hardware and software.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim.

We claim:

1. A mechanical attachment comprising:
   at least one attachment element for attaching the mechanical attachment to a computing device, the computing device comprising a printed control board associated with an electrical connector; and
   a cavity capable of receiving a plurality of different types of electrical cable systems, each of the plurality of different types of electrical cable systems comprising a respective electrical cable and a different type of electrical connector for coupling the respective electrical cable with the printed control board via the electrical connector;
   wherein the mechanical attachment is configured to:
      align, for each of the plurality of different types of electrical cable systems received via the cavity, the different type of electrical connector associated with each of the plurality of different types of electrical cable systems with the electrical connector of the printed control board, and
      provide pass-through connectivity between the plurality of different types of electrical cable systems and the electrical connector of the printed control board such that the different type of electrical connector can be coupled with the electrical connector of the printed control board using a single electrical mating point.

2. The mechanical attachment of claim 1, wherein the mechanical attachment is a diecast block, and wherein the electrical cable system comprises a cable assembly.

3. The mechanical attachment of claim 1, wherein the mechanical attachment provides mechanical support for the plurality of different types of electrical cable systems, and wherein the different type of electrical connector comprises a different type of cable assembly.

4. The mechanical attachment of claim 1, wherein the cavity is adjustable to receive the plurality of different types of electrical cable systems and align the different type of electrical connector of each of the plurality of different types of electrical cable systems with the electrical connector of the printed control board.

5. The mechanical attachment of claim 1, wherein the plurality of different types of electrical cable systems have different sizes or shapes, and wherein a size or shape of the cavity is adaptable to receive each of the plurality of different types of electrical cable systems based on the different sizes or shapes.

6. The mechanical attachment of claim 1, wherein a length of the cavity is adaptable to a plurality of lengths associated with the plurality of different types of electrical cable systems.

7. The mechanical attachment of claim 6, wherein the adaptable length enables the mechanical attachment to adjust a distance between an opening of the cavity and the electrical connector of the printed control board when the mechanical attachment is attached to the computing device.

8. The mechanical attachment of claim 1, wherein the cavity is configured to retain any of the plurality of different types of electrical cable systems and provide mating guidance between the different type of electrical connector and the electrical connector of the printed control board to establish the single mating point.

9. The mechanical attachment of claim 1, further comprising one or more interlocking elements configured to provide at least one of lateral retention when attaching the mechanical attachment to the computing device, vertical retention when attaching the mechanical attachment to the computing device, longitudinal insertion guidance for attaching the mechanical attachment to the computing device, and alignment of the mechanical attachment with the computing device.

10. The mechanical attachment of claim 1, further comprising a stop feature within the cavity to prevent over-insertion of an electrical cable system in the cavity.

11. The mechanical attachment of claim 1, wherein the at least one attachment element comprises a plurality of adjustable interlocking features for attaching and aligning the mechanical attachment to a system chassis associated with the computing device.

12. The mechanical attachment of claim 1, wherein the cavity has an adjustable shape configured to conform to a respective shape associated with the plurality of different types of electrical cable systems.

13. The mechanical attachment of claim 1, further comprising a captive screw configured to adjust a longitudinal retention of the mechanical attachment in a system chassis associated with the computing device.

14. A system comprising:
   a computing device comprising a chassis and a printed control board associated with an electrical connector for electrically coupling the printed control board with one or more electrical connectors associated with a respective electrical cable; and
   a mechanical attachment comprising:
      at least one attachment element for attaching the mechanical attachment to the chassis; and
      a cavity capable of receiving a plurality of different types of electrical cable systems, each of the plurality of different types of electrical cable systems comprising a respective electrical cable and a different type of electrical connector for coupling the respective electrical cable with the printed control board via the electrical connector,
      wherein the mechanical attachment is configured to:
         align, for each of the plurality of different types of electrical cable systems received via the cavity, the different type of electrical connector associated with each of the plurality of different types of electrical cable systems with the electrical connector of the printed control board, and provide pass-through connectivity between the plurality of different types of electrical cable systems and the electrical connector of the printed control board such that the different type of electrical connector can be coupled with the electrical connector of the printed control board using a single electrical mating point.

15. The system of claim 14, wherein the mechanical attachment comprises a diecast block.

16. The system of claim 14, further comprising a vertical justification spring coupled with the mechanical attachment at a location below a mating surface of the printed control board, the vertical justification spring configured to provide vertical alignment of a respective paddle card associated with each of the plurality of different types of electrical cable systems and the electrical connector of the printed control board.

17. The system of claim 14, wherein the mechanical attachment provides mechanical support for the plurality of different types of electrical cable systems.

18. The system of claim 14, wherein the cavity is adjustable to receive any of the plurality of different types of electrical cable systems and align the different type of electrical connector of the plurality of different types of electrical cable systems with the electrical connector of the printed control board.

19. The system of claim 14, wherein the plurality of different types of electrical cable systems have different sizes or shapes, and wherein a size or shape of the cavity is adaptable to receive the plurality of different types of electrical cable systems based on the different sizes or shapes.

20. The system of claim 12, wherein a length of the cavity is adaptable to a plurality of lengths associated with the plurality of different types of electrical cable systems, wherein the adaptable length enables the mechanical attachment to adjust a distance between an opening of the cavity and the electrical connector of the printed control board when the mechanical attachment is attached to the chassis.

* * * * *